United States Patent
Nequist et al.

(10) Patent No.: US 7,698,666 B2
(45) Date of Patent: Apr. 13, 2010

(54) METHOD AND SYSTEM FOR MODEL-BASED DESIGN AND LAYOUT OF AN INTEGRATED CIRCUIT

(75) Inventors: Eric Nequist, Monte Sereno, CA (US); Richard Brashears, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 362 days.

(21) Appl. No.: 11/648,150

(22) Filed: Dec. 29, 2006

(65) Prior Publication Data

US 2008/0163134 A1  Jul. 3, 2008

(51) Int. Cl.
*G06F 17/50* (2006.01)

(52) U.S. Cl. .................... 716/2; 716/5; 716/11

(58) Field of Classification Search ............ 716/1–5, 716/8–11
See application file for complete search history.

(56) References Cited

U.S. PATENT DOCUMENTS

| | | | |
|---|---|---|---|
| 3,842,491 A | 10/1974 | Depuy et al. | |
| 5,335,191 A | 8/1994 | Kundert et al. | |
| 6,077,310 A | 6/2000 | Yamamoto et al. | |
| 6,088,523 A | 7/2000 | Nabors et al. | |
| 6,151,698 A | 11/2000 | Telichevesky et al. | |
| 6,226,781 B1 | 5/2001 | Nistler et al. | |
| 6,415,421 B2 | 7/2002 | Anderson et al. | |
| 6,457,163 B1 * | 9/2002 | Yang | 716/8 |
| 6,493,849 B1 | 12/2002 | Telichevesky et al. | |
| 6,606,735 B1 | 8/2003 | Richardson et al. | |
| 6,636,839 B1 | 10/2003 | Telichevesky et al. | |
| 7,325,206 B2 | 1/2008 | White et al. | |
| 7,353,475 B2 | 4/2008 | White et al. | |
| 7,356,783 B2 | 4/2008 | Smith et al. | |
| 7,360,179 B2 | 4/2008 | Smith et al. | |
| 7,363,099 B2 | 4/2008 | Smith et al. | |
| 7,363,598 B2 | 4/2008 | Smith et al. | |
| 7,367,008 B2 | 4/2008 | White et al. | |
| 7,380,220 B2 | 5/2008 | Smith et al. | |
| 7,393,755 B2 | 7/2008 | Smith et al. | |
| 2005/0037522 A1 | 2/2005 | Smith et al. | |
| 2005/0051809 A1 | 3/2005 | Smith et al. | |
| 2005/0132306 A1 * | 6/2005 | Smith et al. | 716/1 |
| 2005/0196964 A1 | 9/2005 | Smith et al. | |
| 2005/0235246 A1 | 10/2005 | Smith et al. | |
| 2006/0090146 A1 * | 4/2006 | LeBritton et al. | 716/4 |
| 2007/0101305 A1 | 5/2007 | Smith et al. | |
| 2007/0256039 A1 | 11/2007 | White | |

(Continued)

OTHER PUBLICATIONS

International Search Report and Written Opinion dated Jun. 5, 2008 for PCT/US2007/089093.

(Continued)

*Primary Examiner*—Paul Dinh
(74) *Attorney, Agent, or Firm*—Vista IP Law Group LLP

(57) ABSTRACT

Disclosed is a method, system, and computer program product for implementing model-based layout, placement, and routing. Models are used to guide the placement and routing of polygons on the IC layout. In effect, the parameters that are used for placement and routing are guided by the model data so that the layout can be formed with a high degree of manufacturability from the outset.

22 Claims, 5 Drawing Sheets

U.S. PATENT DOCUMENTS

| | | |
|---|---|---|
| 2008/0027698 A1 | 1/2008 | White |
| 2008/0160646 A1 | 7/2008 | White et al. |
| 2008/0162103 A1 | 7/2008 | White et al. |
| 2008/0163139 A1 | 7/2008 | Scheffer et al. |
| 2008/0163141 A1 | 7/2008 | Scheffer et al. |
| 2008/0163148 A1 | 7/2008 | Scheffer et al. |
| 2008/0163150 A1 | 7/2008 | White et al. |
| 2008/0216027 A1 | 9/2008 | White et al. |
| 2009/0031261 A1 | 1/2009 | Smith et al. |
| 2009/0031271 A1 | 1/2009 | White et al. |

OTHER PUBLICATIONS

Chen, L. et al, "Analysis of the Impact of Proximity Correction Algorithms on Circuit Performance", IEEE Trans. on Semiconductor Manufacturing, vol. 12, No. 3, Aug. 1999, pp. 313-322.

Cook, B.D. et al., "Paramid-A Hierarchical, Rule-Based Approach Toward Proximity Effect Correction-Part II: Correction", IEEE Trans. on Semiconductor Manufacturing, vol. 11, No. 1, Feb. 1998, pp. 117-128.

Harafuji, K. et al., "A Novel Hierarchical Approach for Proximity Effect Correction in Electron Beam Lithography", IEEE trans. on CAD of ICs and systems, Col. 12, No. 10, Oct. 1993, pp. 1508-1514.

Lee, S.Y. et al., "Paramid-A Hierarchical, Rule-Based Approach Toward Proximity Effect Correction-Part I: Exposure Estimation", IEEE Trans. on Semiconductor Manufacturing, vol. 11, No. 1, Feb. 1998, pp. 108-116.

International Preliminary Report on Patentability dated Jul. 9, 2009 for PCT Application No. PCT/US2007/089093.

\* cited by examiner

METHOD AND SYSTEM FOR MODEL-BASED DESIGN AND LAYOUT OF AN INTEGRATED CIRCUIT

BACKGROUND AND SUMMARY

The invention is directed to a more efficient approach for implementing layout, placement, and routing of integrated circuit designs.

A semiconductor integrated circuit (IC) has a large number of electronic components, such as transistors, logic gates, diodes, wires, etc., that are fabricated by forming layers of different materials and of different geometric shapes on various regions of a silicon wafer.

The various components of an integrated circuit are initially defined by their functional operations and relevant inputs and outputs. From the HDL or other high level description, the actual logic cell implementation is typically determined by logic synthesis, which converts the functional description of the circuit into a specific circuit implementation. The logic cells are then "placed" (i.e., given specific coordinate locations in the circuit layout) and "routed" (i.e., wired or connected together according to the designer's circuit definitions). The placement and routing software routines generally accept as their input a netlist that has been generated by the logic synthesis process. This netlist identifies the specific logic cell instances from a target standard cell library, and describes the specific cell-to-cell connectivity.

Conventionally, Physical Verification (PV) is one of the final steps that is performed before releasing an IC design to manufacturing. A key component of conventional PV includes the process of Design Rule Check (DRC) to ensure that the design abides by all of the detailed rules and parameters that the foundry specifies for its manufacturing process. Violating a single foundry rule can result in a silicon product that does not work for its intended purpose. Therefore, it is critical in conventional tools that thorough DRC processing is performed before finalizing an IC design.

FIG. 1 shows a flowchart of a conventional process for performing electronic design using DRC. The process begins with the completion of a layout using a place and route tool (102). Once the layout is complete, DRC processing is performed on the layout to identify any rule violations that may exist within the layout (104).

The DRC produces either a "violation" or "no violation" result for each rule that is checked against the layout. Essentially, each rule is associated with one or more parameter values that is checked for compliance with the rule. The DRC process will check those parameters to produce a simple "yes" or "no" answer as to whether the rule has been violated. For example, a very common rule is to check for minimum spacing between objects in a layout. DRC processing will determine whether all objects meet the minimum spacing requirements. If all objects meet the spacing requirements, then the layout meet the rules requirement for spacing. If any objects are spaced closer together than the minimum spacing requirement, then the rules violation will be identified.

If there are any rules violations (106), then the process will modify the layout to correct the rules violation (102). If no rules violations have been identified, then the IC design is passed to the next design stage for manufacturing (108).

DRC tools typically read and manipulate a design database which stores information about device geometries and connectivity. Because compliance with design rules generally constitutes the gating factor between one stage of the design and the next, DRC tools are typically executed multiple times during the evolution of the design and contribute significantly to the project's critical path. Therefore, reducing DRC tool execution time makes a major contribution to the reduction of overall design cycle times.

As the quantity of data in modern IC designs become larger and larger over time, the execution time required to process DRC tools upon these IC designs also becomes greater. The goal of reducing PV tool execution time is in sharp tension with many modern IC designs being produced by electronics companies that are constantly increasing in complexity and number of transistors. The more transistors and other structures on an IC design, the greater amounts of time that is normally needed to perform DRC processing. This problem is exacerbated by constantly improving IC manufacturing technologies that can create IC chips at ever-smaller feature sizes, which allows increasingly greater quantities of transistors to be placed within the same chip area, as well resulting in more complex physical and lithographic effects during manufacture.

In addition, DRC rules often contain design constraints that are much more limiting than are needed for any particular design or portion of a design. DRC rules are often set at the "lowest common denominator" level to ensure that most or all IC designs will properly operate. However, certain IC design may actually need parameters that are more or less cautious than other designs. Since DRC rules typically operate on an "all or nothing" basis, this means that many IC design may fail DRC processing even though they would function properly for intended purposes if manufactured.

Therefore, there is a need for an improved method and system for implementing IC designs that limits the amount of resources consumed by DRC processing.

The present invention is a method, system, and computer program product for model-based method for placement and routing. Models are used to guide the placement and routing of polygons on the IC layout. In effect, the parameters that are used for placement and routing are guided by the model data so that the layout can be formed with a high degree of manufacturability from the outset.

DETAILED DESCRIPTION

The present approach is directed to a model-based method for placement and routing. As used herein, the term "Model" refers to a set of data that identifies one or more specific characteristics within an IC layout and data relating to its effect, manufacturability, and/or usability. For example, a model may present a defined characteristic such as "spacing" and a chart or numeric data indicating the probability of failure/success at different spacing values.

With the present invention, models are used to guide the placement and routing of polygons on the IC layout. In effect, the parameters that are used for placement and routing are guided by the model data so that the layout can be formed with a high degree of manufacturability from the outset. The parameter values can be selected based upon the specific type of design that is being operated upon, so that the layout is optimized for the specific circuit being designed. This can significantly improve upon the "one size fits all" approach used by conventional tools.

Figure 1:
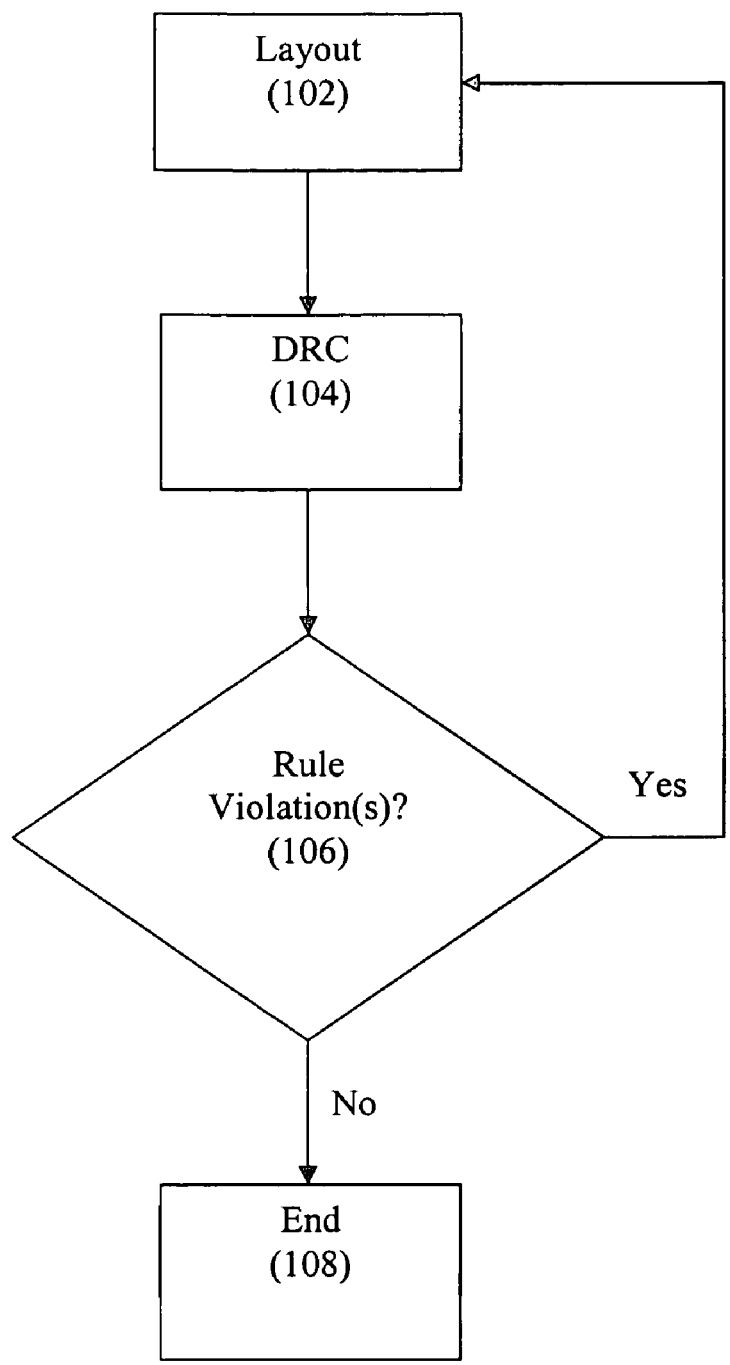
FIG. 1 shows a flowchart of conventional layout processing with DRC.
Figure 2:
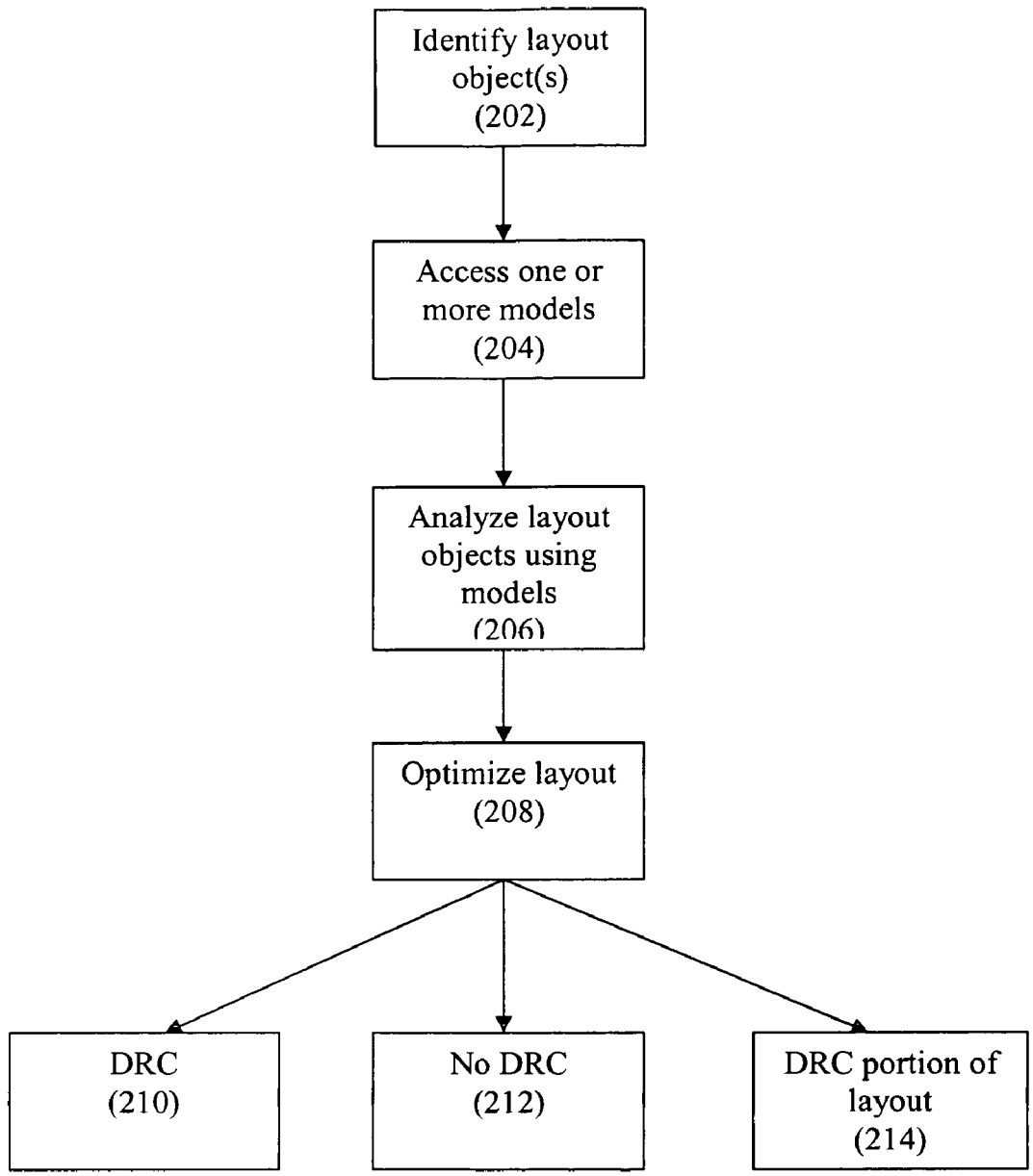
FIG. 2 shows a flowchart of a process for model-based layout according to some embodiments of the invention.

FIG. 2 shows a high-level flowchart of a process for performing model-based processing according to one embodiment of the invention. The first action is to identify the layout objects to process (202). In some embodiments, the present processing is performed upon implementation of an original layout. Therefore, the processing actions are used to perform placement and routing as part of a layout/place and route tool for an original IC design. Alternatively, the present processing may be performed to optimize an existing layout. Therefore, for this alternate approach, an existing layout is received for processing.

In some embodiments, the entire layout is handled using model-based processing. In alternate embodiments, certain different portions of the layout is handled differently than other portions of the layout, with only part of the layout being handled with model-based processing. Some portions of the layout may be more critical or important than other portions of the layout. It is contemplated that the more critical or importance portions of the layout may be associated with enhanced resources or processing. Some of the enhanced resources that may be directed to more critical or important portions may include more accurate or detailed models, as well as increased processing resources (e.g., CPU and memory resources).

The sensitivity of a layout, layout object, or layout portion provides one gauge that can be used to measure the criticality or importance of the layout and its contents. The term "sensitivity" refers to the importance or criticality of any given portion of the layout. A layout portion may correspond to high sensitivity for a number of different reasons. For example, high sensitivity may be associated with a layout portion that is subject to increased risks of variability based upon the contemplated manufacturing process, which can be determined, e.g., based upon manufacturing models. High sensitivity may also be associated with layout portions that correspond to increased risks of yield issues, e.g., based upon review of lithography models. Higher sensitivity may also be associated with areas subject to increased risk of functional failures, e.g., objects corresponding to critical logic structures or critical nets.

Once the layout objects to be operated upon have been identified, one or more models are accessed to perform the layout processing (204). Examples of such models include manufacturability models, CMP (chemical metal polishing) models, lithography models, and electrical models.

The identified layout objects are analyzed using the models to guide placement and/or routing of those objects on the layout (206). Using the models, patterns in the layout are analyzed to provide a measure or score for the placement options of the layout objects. In this way, the IC design can be laid out, placed, and routed in a manner that ensures proper manufacturability, yield, and/or functionality. During placement and routing, the geometric shapes forming the design are established in a manner that will be manufactured properly. These shapes and interactions between shapes are checked by comparing against the model data. Only configurations which will form a correct final design will remain in the design during the place and route process. Any erroneous configurations will be caught during placement and routing, and corrected at this stage. In this manner, no further DRC is required after placement and routing.

Unlike the conventional DRC approach, the result of this analysis action is not merely a "yes" or "no" regarding the advisability of a given layout. Instead, multiple sets of model parameters can be used to provide relative scoring for different configurations of the layout objects, allowing one to not only select an acceptable layout, but to actually optimize the placement of objects for the layout. In this manner, the model data guides the layout process so that the layout can be formed with a high degree of manufacturability from the outset. The parameter values can be selected based upon the specific type of design that is being operated upon, significantly improving upon the "one size fits all" approach used by conventional tools.

In one embodiment, a library of recommended shapes and configurations of shapes will be maintained. This library includes design portions that have already been established as being manufacturable and operational based upon models and/or as confirmed by real world test data. During placement and routing, the EDA tool will if at all possible select from these recommended shapes and configurations of shapes. This further establishes the correctness of the design during the placement and routing stage.

Based upon the above analysis action, the layout is optimized (208). Proposed changes based upon analysis and scoring are reviewed for implementation. This action finalizes the layout to implement the layout configurations that achieves expected manufacturability, yield, and functionality scores.

The present invention could be used to completely or partially eliminate the need for DRC processing. DRC rules are established based upon testing that occurs from fabrication facilities and tool makers. Those baseline test results are typically used to establish rules and parameters that seek a low failure threshold for any type of design. However, those underlying test results and models also form the underlying set of data for determining the adequacy of any given IC design or a portion of an IC design.

In the present embodiment, placement and routing already use those models (or similar models) to ensure correct design from the outset that is specific to the design under consideration. Therefore, the model-based layout should already meet expected goals for which the DRC rules are designed to ensure. As such, it is likely that some or all of the layout does not require an additional DRC stage to ensure such correctness. Moreover, since the layout has been optimized based upon the models, the layout should provide a more appropriate level of performance and manufacturability than the minimal levels being checked for by the DRC rules.

In the embodiment shown in FIG. 2, three possible actions may be taken with regard to DRC. One approach is to perform DRC on the layout to ensure compliance with the DRC rules. The possible drawback with performing DRC is that it is possible the model-based approach may result in a layout which meets manufacturing goals, but which has more aggressive design features than is permitted by the overly conservative DRC rules. For example, it may be decided that a given layout configuration may include spacing that is smaller than the minimum spacing allowed by DRC rules, e.g., for less sensitive portions of the layout. Therefore, in one embodiment, the DRC approach of (210) may be modified to allow exceptions for model-based layout portions that meet manufacturing goals but do not satisfy DRC rules.

Another approach is to assume that model-based layout is acceptable and to forgo DRC checks against the model-based layout, or at least against the layout portions that received model-based processing (212). A final option is to perform DRC against only some of the layout, but to forgo DRC against other portions of the layout. This embodiment may also be used to only apply DRC for some rules but not for other rules. The determination of which layout portions to receive DRC or which rules to apply could be based upon any criteria, e.g., the sensitivity of a given layout portion or based upon which layout portions received model-based processing.

Figure 3:
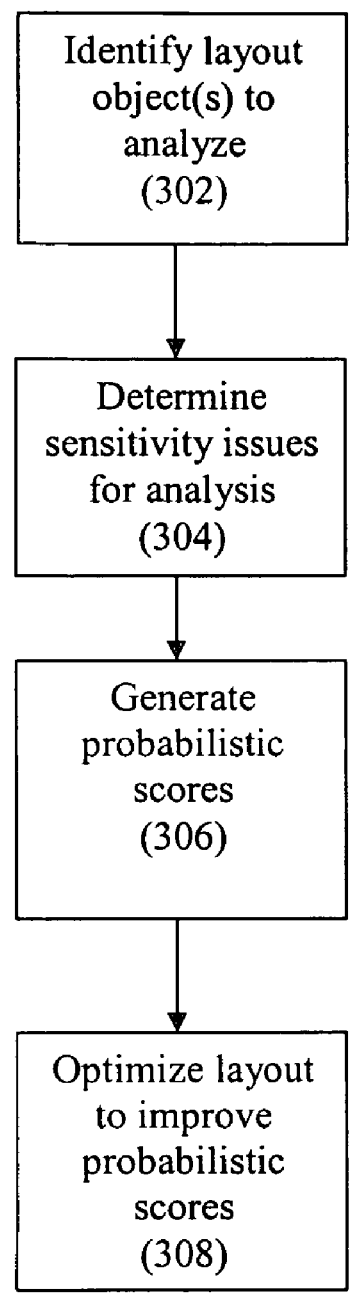
FIG. 3 shows a flowchart of a process for using models to analyze layout components according to some embodiments of the invention.

FIG. 3 shows a detailed flowchart of a process to implement the analysis action(s) of FIG. 2. The first action is to identify the specific layout object so the analyzed (302). As noted above, this action is partially determined by whether all or part of the layout is to undergo model-based processing.

Sensitivity issues may be to guide the analysis regarding particular portions of the layout (304). The models may be used to determine the sensitivity of some or all of the layout portions. Higher sensitivity potions of the layout may receive enhanced resources as compared to lower sensitivity portions of the layout. For example, more accurate models may be needed to process higher sensitivity portions of the layout, whereas less accurate models may be sufficient to process lower sensitivity portions of the layout.

The layout portions are analyzed to generate probabilistic scores for each identified layout portion and configuration combination (306). The scoring provides a measure of the probability of manufacturing results for a given combination of parameters. This can be used to provide an estimate of the viability of a layout as well as the statistical possibility of the predicted result actually occurring, with the accuracy of the estimate based upon the accuracy of the source models. One approach is to provide a percentage value for the particular scoring parameters being examined, e.g., "99.8 percent yield probability" and "92 percent variability probability."

By comparing the scores for different combinations, the process can be used to identify the optimal combination of factors and parameters for a selected design, process, and manufacturing goal (308). In addition, predictive analysis can be performed to estimate scores for a range of possible combinations. The range of possible combinations can be compared to identify the specific layout pattern that is expected to not only meet stated manufacturing goals, but to also produce an optimal result.

Figure 4:
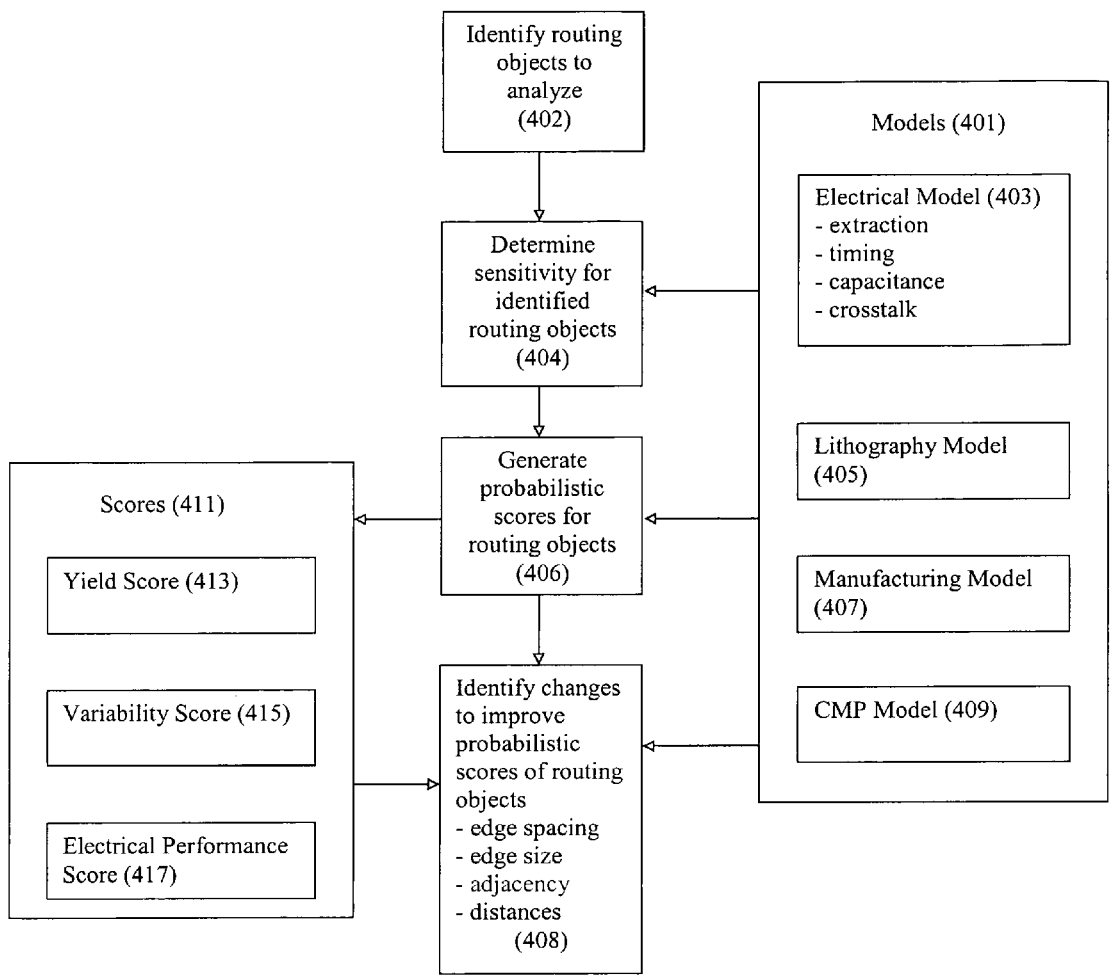
FIG. 4 shows a flowchart of a process for model-based routing according to some embodiments of the invention.

FIG. 4 shows a flowchart of a detailed embodiment for implementing model-based routing. The first action is to identify the routing objects that need to be analyzed (402). As noted above, this action is partially determined by whether all or part of the layout is to undergo model-based processing. In addition, this action is affected by the sensitivity analysis that will also be performed in conjunction with the models.

A number of different models (401) may be used to perform model-based routing. Some examples of models (401) that may be used include electrical models (403), lithography models (405), manufacturing models (407), and CMP models (409). The electrical models are used to identify data and equations relating to probable or possible electrical effects for electronic components in the layout. Example information/models that may exist in the one or more electrical models (403) include extraction information, timing information, capacitance information, and crosstalk information. Example information that may exist in the lithography models (405) include test and modeling data based upon specific fabrication processes for given fabrication facilities relating to various test data relating to lithography can layout parameters, such as spacing, dimension, width, and edge parameters. Example information that may exist in the manufacturing models (407) include test and modeling data based upon manufacturing parameters resulting from or used in fabrication and manufacturing processes. The CMP models (409) include test and modeling data based upon CMP related parameters for different CMP processes, facilities, and parameters.

Sensitivity calculations are performed using the models to identify which routing objects are to be addressed and how those identified routing objects should be addressed (404). The sensitivity of some or all of the routing objects may be determined using the models. As noted above, high sensitivity may be associated with a layout portion that is subject to increased risks of variability based upon the contemplated manufacturing process. Higher sensitivity may also be associated with areas subject to increased risk of functional failures. For example, routing structures that are associated with a critical net may be subject to higher sensitivities as compared to routing objects associated with non-critical nets. The sensitivity of some routing components may be affected by the objects in the neighborhood of that object. For example, narrow wires near wide objects may have different sensitivities to spacing and yield effects than the same narrow wire that is nearby another narrow wire. As another example, a power line object may normally be considered of low sensitivity, but that same power line object may be subject to higher sensitivities if placed near a critical net. Design intent may also be used to identify the sensitivity measure of an object. For example, the non-functional logo portion of a layout may be associated with a very low sensitivity measure since it is entirely non-functional by design.

Higher sensitivity potions of the layout may receive enhanced resources as compared to lower sensitivity portions of the layout. For example, more accurate models may be needed to process higher sensitivity portions of the layout, whereas less accurate models may be sufficient to process lower sensitivity portions of the layout.

The routing objects are analyzed to generate probabilistic scores for each identified layout portion and configuration combination (406). The scoring provides a measure of the probability of manufacturing results for a given combination of parameters. This can be used to provide an estimate of the viability of a layout as well as the statistical possibility of the predicted result actually occurring, with the accuracy of the estimate based upon the accuracy of the source models.

A number of types of probabilistic scores (411) may be used to perform model-based routing. Some example types of scores (411) that may be used include yield scores (413), variability scores (415), and electrical performance scores (417). The yield scores (411) provide a measure of the probability of a given yield result begin achieved with a particular routing configuration. The variability scores (415) provide a measure of the probability of a certain amount of manufacturing variance with a specified routing configuration. The electrical performance scores (417) provide a measure of the probability of certain electrical performance characteristics being achieved with a particular routing configuration.

By comparing the scores for different combinations, the process can be used to identify the optimal combination of factors and parameters for a selected design, process, and manufacturing goal (408). Predictive analysis can be performed to estimate scores for a range of possible combinations. The range of possible combinations can be compared to identify the specific layout pattern that is expected to not only meet stated manufacturing goals, but to also produce an optimal result.

Potential changes may be effected to improve the scoring for a layout. For routing structures, examples of such layout changes may include changes to edge spacing, edge size, object adjacency, and object distances. Changes to these and other parameters can be analyzed to determined expected changes, both good and bad, to the scoring. The optimal set of configurations, and changes if any, are applied to achieve expected optimal routing.

System Architecture Overview

Figure 5:
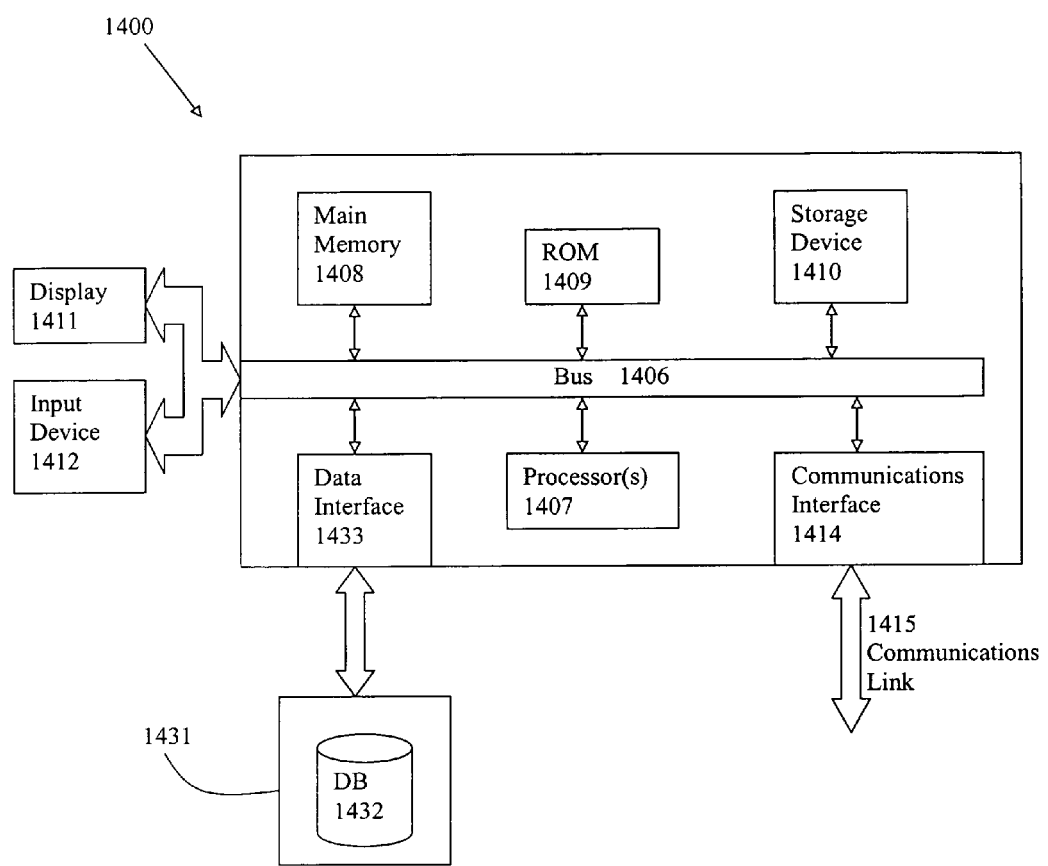
FIG. 5 shows an architecture of an example computing system with which the invention may be implemented.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for model-based layout of an integrated circuit design, comprising:
   using computer system which comprises at least a processor and is programmed for:
      identifying a layout object to process for a least a portion of the integrated circuit design;
      accessing one or more models relating to manufacturing of the integrated circuit design;
      analyzing the layout object using the one or more models to identify a plurality of configurations for the layout object;
      optimizing the layout based at least in part upon the act of analyzing the layout object to ensure compliance with one or more design rules without requiring performing design rule checking for the at least the portion of the integrated circuit design, wherein
         the act of optimizing the layout comprises modifying a first design rule for the at least the portion of the integrated circuit to allow for a layout characteristic that is not permitted by the first design rule before modification; and
      storing at least some of the plurality of configurations in a computer readable storage medium or a computer storage device or displaying the at least some of the plurality of configurations on a display device of the computer system.

2. The method of claim 1 which is performed to layout the integrated circuit design in realtime for an original design.

3. The method of claim 1 which is performed to optimize a pre-existing design.

4. The computer implemented method of claim 1 which is performed to process an entire layout or a first portion of the entire layout of the integrated circuit design.

5. The method of claim 1 in which the one or more models comprise at least one of manufacturability models, CMP (chemical metal polishing) models, lithography models or electrical models.

6. The computer implemented method of claim 1 in which geometric shapes forming the layout object are established in a manner that will be manufactured properly during a process of placement or routing.

7. The method of claim 1 in which DRC (design rule checking) is not performed upon all or a portion of the layout.

8. The method of claim 1 in which multiple sets of model parameters are used to provide relative scoring for different configurations of the layout object.

9. The computer implemented method of claim 8, wherein the relative scoring comprises a probabilistic scoring for yield of an integrated circuit which is manufactured according to the integrated circuit design.

10. The method of claim 5 in which more critical portions of the layout are processed with more accurate models.

11. The computer implemented method of claim 8 the model parameters can be selected based upon a specific type of design that is being operated upon.

12. The method of claim 11 in which a library of recommended shapes or configurations of shapes is maintained and used for the layout.

13. The method of claim 1 in which scoring is used to optimize the layout.

14. The method of claim 13 in which probabilistic scores are generated for an identified layout portion which provides a measure of the probability of manufacturing results for a given combination of parameters.

15. The method of claim 14 in which scores for different possible layout configurations are compared to identify the optimal combination of factors and parameters for a selected design, process, and/or manufacturing goal.

16. The method of claim 14 in which the probabilistic scores comprise at least one of yield scores, variability scores, or electrical performance scores.

17. The computer implemented method of claim 1 in which the one or more models are used to determine a sensitivity of the layout object or a portion of the layout which includes the layout object.

18. The method of claim 17 in which higher sensitivity potions of the layout receive enhanced resources as compared to lower sensitivity portions of the layout.

19. The method of claim 18 in which more accurate models are used to process one or more higher sensitivity portions of the layout, whereas less accurate models are sufficient to process one or more lower sensitivity portions of the layout.

20. The method of claim 1 in which the layout is optimized to change edge spacing, edge size, object adjacency, or object distances.

21. A computer program product that includes a computer readable medium, the computer readable storage medium comprising a plurality of computer instructions which, when executed by a processor, cause the processor to execute performing a process for model-based layout of an integrated circuit design, the process comprising:
using computer system which comprises at least a processor and is programmed for:
identifying a layout object to process for at least a portion of the integrated circuit design;
accessing one or more models relating to manufacturing of the integrated circuit design;
analyzing the layout object using the one or more models to identify a plurality of configurations for the layout object;
optimizing the layout based at least in part upon the act of analyzing the layout object to ensure compliance with one or more design rules without requiring performing design rule checking for the at least the portion of the integrated circuit design, wherein
the act of optimizing the layout comprises modifying a first design rule for the at least the portion of the integrated circuit to allow for a layout characteristic that is not permitted by the first design rule before modification; and
storing at least some of the plurality of configurations in a first computer readable storage medium or a computer storage device or displaying the at least some of the plurality of configurations on a display device of the computer system.

22. A system for model-based layout of an integrated circuit design, comprising:
a computer system which comprises at least one processor and is programmed for performing:
identifying a layout object to process for at least a portion of the integrated circuit design;
accessing one or more models relating to manufacturing of the integrated circuit design;
analyzing the layout object using the one or more models to identify a plurality of configurations for the layout object; and
optimizing the layout based at least in part upon analyzing the layout object to ensure compliance with one or more design rules without requiring performing design rule checking for the at least the portion of the integrated circuit design, wherein
the act of optimizing the layout comprises modifying a first design rule for the at least the portion of the integrated circuit to allow for a layout characteristic that is not permitted by the first design rule before modification; and
storing at least some of the plurality of configurations in a computer readable storage medium or a computer storage device or displaying the at least some of the plurality of configurations on a display device of the computer system.

* * * * *